United States Patent Office 2,824,676
Patented Feb. 25, 1958

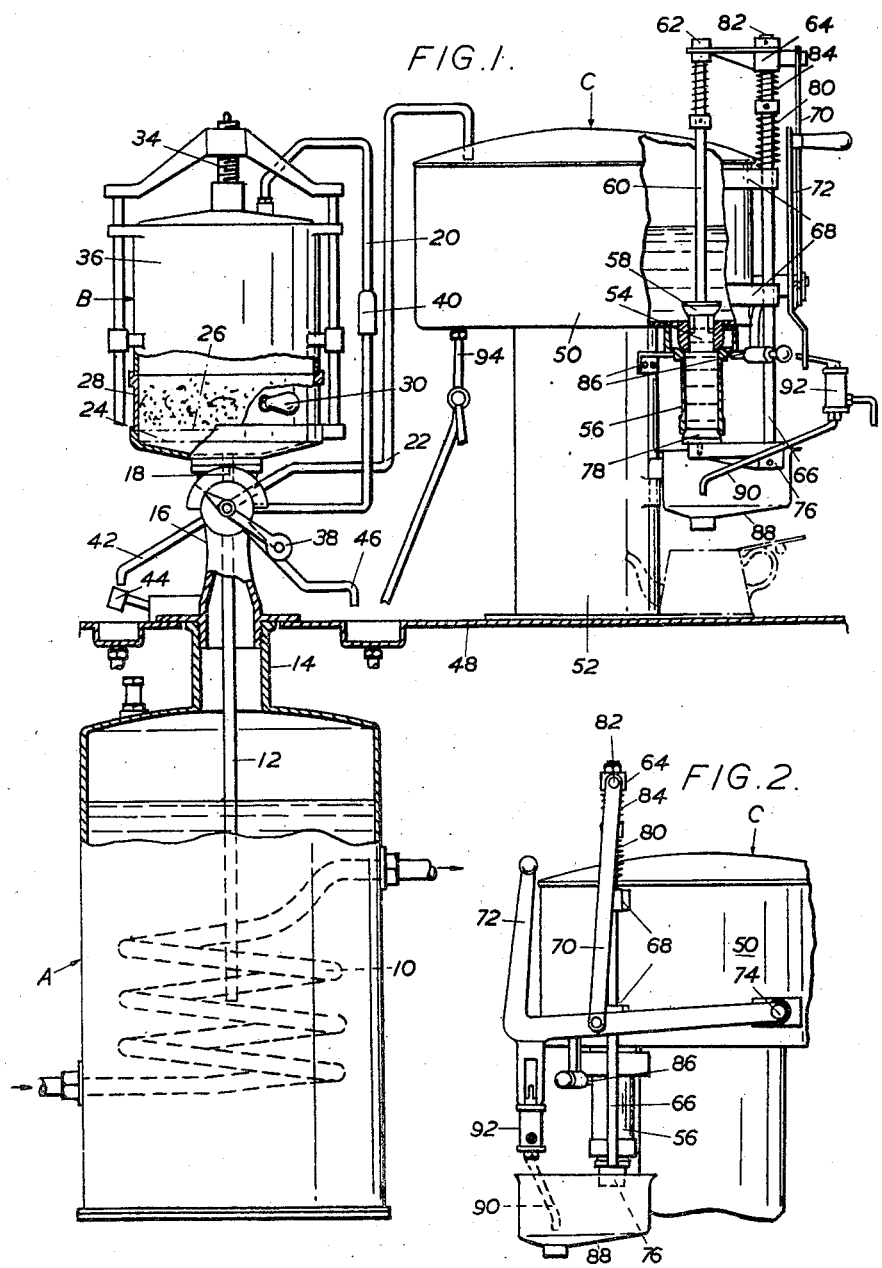

2,824,676

DISPENSING APPARATUS

Frederick W. Still and Audley Furneaux, London, England, assignors to W. M. Still & Sons Limited, London, England Application January 31, 1955, Serial No. 485,183

4 Claims. (Cl. 222—442)

This invention relates to apparatus for dispensing beverages which require to be infused.

The main object of the invention is to provide apparatus in which the infusion and dispensing of the beverage is effected semi-automatically and therefore more rapidly than in the apparatus used hitherto. The invention has particular value, for example, in large catering establishments or in the canteens of large factories.

According to the invention, apparatus for dispensing beverages which require to be infused comprises a boiler, an infuser and a dispenser, the boiler being connected to the infuser for the supply thereto of boiling water for effecting the infusion of the beverage and of steam for expulsion of the infused beverage into the dispenser, and the dispenser being provided with manually-operated means for delivering the beverage in measured quantities.

Preferably, the boiling water is supplied to the lower part of the infuser while the steam for expulsion of the infused beverage is supplied to the upper part of the infuser. In order to ensure safe operation, a valve or valves may be provided by which the simultaneous supply of boiling water and steam to the infuser is made impossible.

In order that the invention may be thoroughly understood, an example in accordance with it will now be described with reference to the accompanying drawings, in which:

Figure 1 is a side elevation of the apparatus with parts shown in section; and

Figure 2 is a view from another angle of part of the dispenser.

The apparatus shown in Figure 1, which has been designed for the infusion and dispensing of tea, comprises a pressure-boiler A, an infuser B and a dispenser C. The boiler A shown in the drawings is steam-heated by means of the coil 10, but the nature of the source of heat is of little importance as far as the present invention is concerned. A tube 12 extends into the boiler for drawing off boiling water and passes upwards with considerable clearance through a neck 14 of the boiler for drawing off steam under pressure. The tube 12 and the neck 14 both lead into a valve housing 16 which is connected by the passage 18 to the lower part of the infuser B; by the tube 20 to the upper part of the infuser; and by the tube 22 to the dispenser C.

The infuser B, which is supported by the valve housing 16, is provided in its lower part with a perforated plate 24 and, a little above this plate, with a wire-mesh screen 26. The portion 28 of the infuser surrounding the screen 26 forms with the latter a container for the dry tea which is removable from the infuser as a whole. The container has a handle 30 and may be removed from the infuser by rotating a screw-threaded rod 34 mounted on the infuser, which moves the upper part 36 of the infuser away from the position in which it bears on the edge of the lower part 28. To allow this movement to take place, the tube 20 is made in two parts joined together in a fluid-tight manner at 40.

In operation, the container 26, 28 receives a charge of dry tea and is replaced in the infuser. The valve handle 38 is set to the middle one of its three positions by which the tube 12 is connected to the passage 18 so that boiling water from the boiler A enters the infuser B. The perforated plate 24 and the screen 26 cause agitation of the inflowing water so that infusion of the tea is rapid and thorough. When the infuser is full, the excess liquid overflows through the tube 20, which, with the valve handle 38 in its present position, is in communication with the tube 42, and pours into a small cup 44 carried on the end of a pivotally mounted balance arm urged upwards by a light spring (not shown). The weight of the liquid entering the cup causes the arm to be depressed and so switch in an electrically-operated warning bell which indicates to the person using the apparatus that the infused tea is ready for expulsion from the infuser B into the dispenser C.

The bottom of the cup 44 has a small drain hole so that, once the liquid coming through the tube 42 has been shut off, the arm carrying the cup soon resumes its normal position and the warning bell ceases to sound.

The valve handle 38 is now set to the third of its three positions by which the pipe 20 is disconnected from the pipe 42 and is connected to the neck 14 of the boiler. Steam under pressure is thus passed into the top of the infuser B so that the infused tea is expelled through the passage 18 which, with the valve handle in its present position is out of communication with the pipe 12 and is connected to the pipe 22 leading to the dispenser C. The valve handle is maintained in this position until the expulsion of the tea from the infuser is complete, i. e. until steam alone begins to appear at the mouth of the tube. This can be ascertained either by lifting the removable lid of the dispenser C or by providing a small window in the latter. The valve handle 38 is then moved into the first of its three positions which is the normal inoperative position.

The tube 20 is thereby disconnected from the neck 14 and connected to the tube 42 so that the steam within the infuser passes out to atmosphere. The passage 18 is disconnected from the pipe 22 leading to the dispenser and connected to a pipe 46 leading to a drain provided in the counter 48 so that any residual tea in the infuser and associated passages can drain away.

The dispenser C comprises a main container 50 supported on a pillar 52 and connected through a passage 54 to a small measuring chamber 56 held beneath it. The passage 54 is controlled by a valve 58 carried on the end of a vertical rod 60 held up through a collar 62 by a horizontal support 64 slidably mounted on a guide rod 66 which itself is slidably mounted in a pair of brackets 68 attached to the main container 50. As shown more clearly in Figure 2, the support 64 is connected through a link 70 to a hand-lever 72 pivotally mounted at 74 on the main container 50.

At its lower end, the guide rod 66 carries a horizontal bracket 76 on which is supported a frusto-spherical member 78 forming the base of the measuring chamber 56. The base 78 is held against the cylindrical walls of the chamber 56 by a compression spring 80 surrounding a part of the guide rod 66 and abutting against a collar on the latter. The slidable support 64 is likewise held against a stop 82 on the upper end of the guide rod 66 by a compression spring 84.

The dispensing of a measured quantity of tea is effected by depressing the hand lever 72. The spring 84 is weaker than the spring 80 so that during the initial movement of the lever 72, the horizontal support 64 slides down the guide rod 66 which itself remains stationary. The passage 54 connecting the main container 50 to the measuring chamber 56 is thus closed by the valve 58. Continued downward movement of the lever 72 causes the spring 84 to be compressed to such an extent that the guide rod 66 also begins to move downwards, taking with it the base 78 of the measuring chamber 56. The cylindrical wall of the latter moves down with the base 78 until a shoulder on the container meets a pair of stops 86. This limited downward movement of the cylindrical wall of the container has the effect of opening the upper part of the container to atmosphere so that, as the base 78 continues its downward movement and moves away from the rest of the container, the contents of the container are rapidly discharged into a pan 88.

The tea discharged into the pan 88 is highly concentrated and is therefore diluted with boiling water supplied through a pipe 90. A spring-loaded valve 92 in the pipe is operated by an extension of the hand lever 72 so that boiling water is supplied through the pipe 90 as the contents of the measuring container 56 are discharged.

The lever 72 is then released and the parts return to the positions shown in the drawings under the action of the springs 80 and 84. The valve 58 is thus moved clear of the passage 54 and a fresh charge of tea flows from the main container 50 into the measuring container 56. The dispenser C is then ready for the lever 72 to be depressed again.

The dispensing of successive measured quantities of tea can be carried out very rapidly using a dispenser of the kind shown in the drawings but it is, nevertheless, advantageous to provide a steam-heated coil in the main container 50 to keep the tea contained therein as hot as possible during dispensing. Alternatively, the upper part of the pillar 52 supporting the container 50 can comprise a steam chamber. In both cases, the steam is conveniently supplied by the boiler A.

Preferably, the container 50 is supplied with an additional outlet such as that shown at 94 for draining purposes.

Special attention is drawn to the fact that all the tubes connecting the boiler, the infuser and the dispenser can be cleaned by blowing through them hot water or steam from the boiler.

It is not essential to have a single valve handle 38 for controlling the flow through the tubes. For example, the flow of boiling water into the infuser may be controlled by one valve and the flow of steam into the infuser controlled by a separately-operated valve. An obvious advantage of providing a single control however is that it prevents the boiling water and steam being supplied to the infuser at the same time which could endanger the person using the apparatus.

If it is desired that customers in a buffet, for example, should help themselves to tea, a coin or check-freed mechanism may be employed ensuring that the hand lever 72 of the dispenser can be depressed only after the insertion of an appropriate coin or check.

We claim:

1. In apparatus for dispensing beverages comprising a boiler, an infuser and a dispenser: a dispenser comprising a main container for the beverage, a readily-detachable measuring chamber, a communicating passage between said main container and said measuring chamber, valve means for controlling liquid-flow through said communicating passage, a displaceable base portion forming part of said measuring chamber, linkage connecting means disposed outside said measuring chamber and connecting said valve means to said displaceable base portion, said linkage connecting means being operable whereby they may be moved into a position wherein said valve means close said communicating passage and said base portion of said measuring chamber is displaced by a substantial amount from the remaining portion of said measuring chamber, said measuring chamber being displaceable downwardly away from said communicating passage whereby atmospheric air may enter the upper part of said measuring chamber to facilitate discharge of the liquid contents thereof.

2. In apparatus for dispersing beverages comprising a boiler, an infuser and a dispenser: a dispenser comprising a main container for the beverage, a readily-detachable measuring chamber, a communicating passage between said main container and said measuring chamber, valve means for controlling liquid-flow through said communicating passage, a displaceable base portion forming part of said measuring chamber, linkage connecting means disposed outside said measuring chamber and connecting said valve means to said displaceable base portion, said linkage connecting means being operable whereby they may be moved into a position wherein said valve means close said communicating passage and said base portion of said measuring chamber is displaced by a substantial amount from the remaining portion of said measuring chamber, said measuring chamber being displaceable downwardly away from said communicating passage whereby atmospheric air may enter the upper part of said measuring chamber to facilitate discharge of the liquid contents thereof, said downwards displacement of said measuring chamber being limited by at least one stop.

3. In apparatus for dispensing beverages comprising a boiler, an infuser and a dispenser: a dispenser comprising a main container for the beverage, a readily-detachable cylindrical measuring chamber, a communicating passage between said main container and said measuring chamber, valve means for controlling liquid-flow through said communicating passage, a displaceable base portion forming part of said measuring chamber, a frusto-spherical bearing surface on said displaceable base portion adapted to provide a seal with the lower edge of said cylindrical measuring chamber, linkage connecting means disposed outside said measuring chamber and connecting said valve means to said displaceable base portion, said linkage connecting means being operable whereby they may be moved into a position wherein said valve means close said communicating passage and said base portion of said measuring chamber is displaced by a substantial amount from the remaining portion of said measuring chamber, said measuring chamber being displaceable downwardly away from said communicating passage whereby atmospheric air may enter the upper part of said measuring chamber to facilitate discharge of the liquid contents thereof.

4. In apparatus for dispensing beverages comprising a boiler, an infuser and a dispenser: a dispenser comprising a main container for the beverage, a readily-detachable measuring chamber, a shoulder on said measuring chamber, a communicating passage between said main container and said measuring chamber, valve means for controlling liquid-flow through said communicating passage, a downwardly-displaceable base portion forming part of said measuring chamber, linkage connecting means disposed outside said measuring chamber and connecting said valve means to said downwardly-displaceable base portion, said linkage connecting means being operable whereby they may be moved into a position wherein said valve means close said communicating passage and said base portion of said measuring chamber is displaced downwardly by a substantial amount from the remaining portion of said measuring chamber, said measuring chamber being displaceable downwardly away from said communicating passage whereby atmospheric air may enter the upper part of said measuring chamber to facilitate discharge of the liquid contents thereof, said downwards displacement of said measuring chamber being limited by stop means, said stop means being arranged to abut against said shoulder on said measuring chamber.

(References on following page)

References Cited in the file of this patent

UNITED STATES PATENTS

| | | |
|---|---|---|
| 389,079 | Huff | Sept. 4, 1888 |
| 423,127 | Childs | Mar. 11, 1890 |
| 1,731,795 | Roberts | Oct. 15, 1929 |
| 1,800,368 | Tomlinson | Apr. 14, 1931 |
| 2,588,206 | Clark | Mar. 4, 1952 |

FOREIGN PATENTS

| | | |
|---|---|---|
| 174,981 | Switzerland | May 1, 1935 |
| 282,677 | Germany | Mar. 16, 1915 |
| 438,184 | Great Britain | Nov. 12, 1935 |